United States Patent [19]

Clay

[11] Patent Number: 4,654,998
[45] Date of Patent: Apr. 7, 1987

[54] DEVICE FOR ATTRACTING AND TRAPPING FLEAS

[76] Inventor: Anthony H. Clay, 5161 Rolling Fields, Memphis, Tenn. 38134

[21] Appl. No.: 804,903

[22] Filed: Dec. 5, 1985

[51] Int. Cl.⁴ .......................... A01M 1/04; A01M 1/16
[52] U.S. Cl. ........................................ 43/113; 43/115
[58] Field of Search ................ 43/113, 107, 114, 115, 43/136

[56] References Cited

U.S. PATENT DOCUMENTS

| | | | |
|---|---|---|---|
| 993,547 | 5/1911 | Rea | 43/113 |
| 1,009,580 | 11/1911 | Robinson | 43/113 |
| 1,723,919 | 8/1929 | Bykowy | 43/114 |
| 2,013,969 | 9/1935 | Menasche | 43/139 |
| 3,023,539 | 3/1962 | Emerson | 43/113 |
| 3,348,332 | 10/1967 | O'Connell | 43/113 |
| 3,950,886 | 4/1976 | Newhall | 43/113 |
| 4,566,220 | 1/1986 | Justice | 43/113 |

*Primary Examiner*—Gene P. Crosby
*Attorney, Agent, or Firm*—Walker & McKenzie

[57] ABSTRACT

A flea attractant is located within the hollow interior of a housing assembly having an entrance opening thereinto covered by open mesh screen which allows fleas to freely pass therethrough while preventing anything substantially larger than a normal flea from passing into the interior of the housing assembly. A flea trapping medium such as a sticky substance is also located within the interior of the housing member to trap fleas that come in contact therewith.

13 Claims, 6 Drawing Figures

DEVICE FOR ATTRACTING AND TRAPPING FLEAS

BACKGROUND OF THE INVENTION

The present invention relates in general to a device for use indoors or outdoors to attract and trap fleas.

Flea infestation is a prevalent problem in many area of the world and is especially troublesome for pet owners, kennel owners, farmers, ranchers and the like. The typical method of attempting to control flea infestation has been using toxic substances such as spray, powder and the like. However, such methods have not proved entirely satisfactory since, for example, the substances often create a hazard to humans and animals, and fleas have a tendency to become immune to the substances over a period of time.

SUMMARY OF THE INVENTION

The device of the present invention is designed specifically to control fleas in a given area without the use of toxic substances. The concept of the present invention is to attract fleas to a trapping medium located within the hollow interior of a housing assembly having an entrance aperture thereinto covered by an open mesh screen which allows fleas to freely pass therethrough while preventing anything substantially larger than a normal flea from passing into the interior of the housing assembly.

The device of the present invention comprises, in general, a housing assembly having a hollow interior and having an entranced opening for allowing fleas to enter the hollow interior thereof, the housing assembly includes an open mesh screen means covering the entrance opening for allowing fleas to freely pass therethrough while preventing anything substantially larger than a normal flea from passing therethrough; attractant means located within the hollow interior of the housing assembly for attracting fleas through the open mesh screen means into the hollow interior of the housing assembly; and trapping medium means located within the hollow interior of the housing assembly for trapping fleas entering the interior of the housing assembly.

The flea trap of the present invention is designed specifically for fleas in a given area to be controlled without the use of toxic substances. Light is the primary source of attractant. Heat, pheromones, and other odors may be used with light or independently as secondary attractants. The attractant draws fleas into the trap into a trapping medium which may be a base made of plastic, cardboard or another like material coated with a sticky substance with sufficient consistency to cause fleas which hop onto it to not be able to free themselves; or the trapping medium may be a liquid, such as water, with a few drops of detergent or light-weight oil added to hasten drowning of the fleas. Two models have been designed—one uses 110 household electric current to power the light or heat element and can be used only in sheltered areas; the other is designed with a battery operated light and may be used outdoors or indoors. One trap is needed to each one hundred square foot area to be controlled. The trap may be placed in any area where hopping stage of fleas is present. Progressive elimination may take a few days to a few weeks depending on conditions affecting the life cycle of the fleas. The area should be darkened except for the light of the trap. Infested animals should be kept from the control area as the adult fleas on the animals are continually laying eggs which drop off and infestation continues.

The trap of the present invention is designed to control fleas in a given area without the use of toxic substances. The fleas are attracted into a trapping medium inside the trap by light primarily and by heat or other secondary attractants, such as pheromones or other odors. The light may be from an incandescent bulb which also produces heat or from a fluorescent bulb with little or no heat or from a dry cell light means which produces no heat. If no light is desired, a small heat element may be used. Pheromones or other types of attractant odors may be used with light and/or heat or may be used independently. The trapping medium may be a plastic, cardboard or other like material coated with a sticky substance of sufficient consistency to cause fleas that come in contact with it to not be able to free themselves. The sticky substance coated base is placed with sticky side up in the bottom of the pan beneath the light and/or heat inside the trap. The pan is constructed so that a liquid can be used instead of the sticky substance coated base. The liquid may be water with a few drops of detergent or light-weight oil added to hasten drowning of the fleas. The wall of the trap is made of open mesh material with openings sufficient to permit entry of fleas but exclude larger insects. The energy source for the electric model is supplied by household 110 electric current, and the battery model has a light using dry cell batteries. The battery model may be used indoors or outdoors. The electric model is to be used in sheltered areas only.

The flea trap of the present invention is most effective in darkened areas except for the trap light. The trap is to be placed on the floor or any surface where there are fleas. Progressive control is accomplished within a few days to a few weeks depending on conditions affecting the life cycle of the fleas. Complete elimination of fleas can be expected when no infested animals are allowed in the control area.

DESCRIPTION OF THE PREFERRED EMBODIMENT

The device 11 of the present invention (see, in general, FIGS. 1 and 2) is specifically designed to attract and trap fleas.

Figure 2:
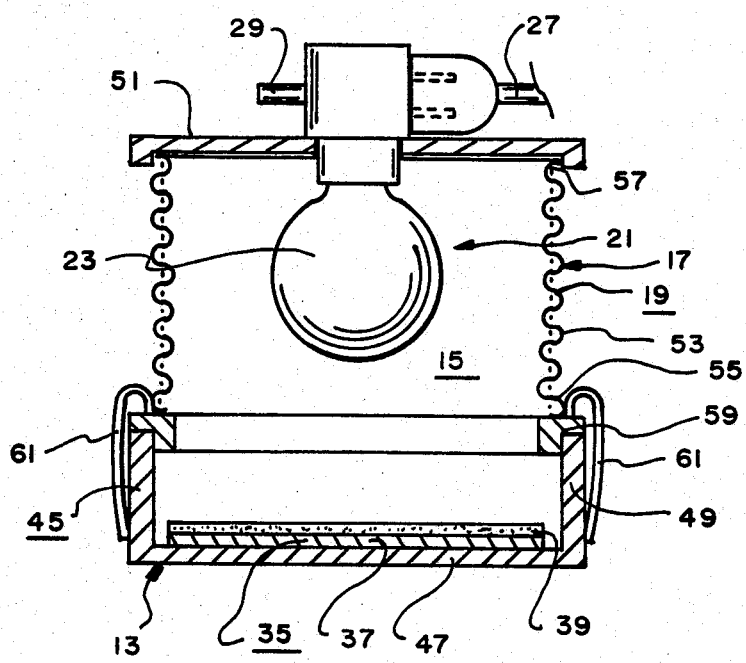
FIG. 2 is a sectional view thereof.

The device 11 includes a housing assembly 13 having a hollow interior 15 and having an entrance opening 17 for allowing fleas to enter the hollow interior 15 thereof (see FIG. 2). The housing assembly 13 includes an open mesh screen means 19 covering the entrance opening 17 for allowing fleas to freely pass therethrough while preventing anything substantially larger than a normal flea from passing therethrough.

Figure 4:
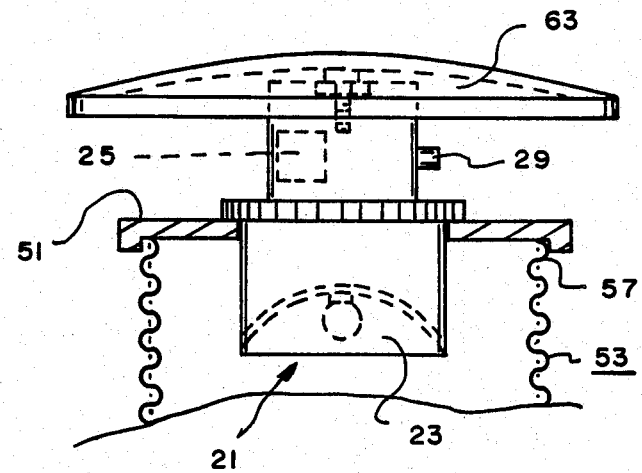
FIGS. 4-6 are sectional views of a portion thereof showing alternative attracting means.
Figure 5:
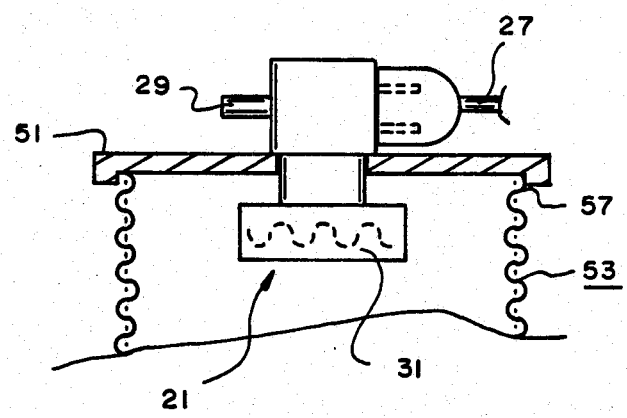
Figure 6:
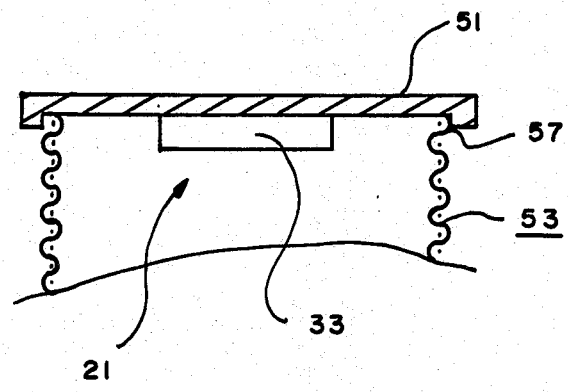

The device 11 includes an attractant means 21 located within the hollow interior 15 of the housing assembly 13 (see FIGS. 2, 4, 5, and 6) for attracting fleas through the open mesh screen means 19 into the hollow interior 15 of the housing assembly 13. The attractant means may be of various specific types. Thus, the attractant means 21 may include a light means 23 of, for example, 4 to 15 watts for generating light within the hollow interior 15 of the housing assembly 13 (see FIGS. 1, 2 and 4) to attract fleas into the hollow interior 15 of the housing assembly 13 as will be apparent to those skilled in the art. The light means 23 may be powered by a direct current electrical energy source, such as a battery 25 or the like (see FIG. 4). On the other hand, a connection means 27, such as a typical extension cord, may be attached to the light means 23 for allowing the light means 23 to be electrically coupled to a source of alternating current electrical energy, such as a typical electrical outlet (see FIGS. 1 and 2). In either event, the light means 23 preferably includes a switch member 29 for controlling the operation thereof.

The attractant means 21 may, on the other hand, include a heat means 31 for generating heat within the hollow interior 15 of the housing assembly 13 (see FIG. 5) to attract fleas into the hollow interior 15 of the housing assembly 13 as will be apparent to those skilled in the art. The heat means 31 may consist of a typical electrical resistance heat element powered either by direct current energy from a battery or the like or by alternating current energy from a typical electrical outlet. It should be noted that the light means 23 may generate heat within the hollow interior 15 of the housing assembly 13 to act as both a light and heat producing means to attract fleas into the hollow interior 15 of the housing assembly 13. This is especially true when the light means 23 includes an incandescent light bulb as will now be apparent to those skilled in the art.

On the other hand, the attractant means 21 may include an odor-producing substance 23, such as a quantity of pheromones or the like (see FIG. 6) for attracting fleas into the hollow interior 15 of the housing assembly 13 as will be apparent to those skilled in the art.

Figure 1:
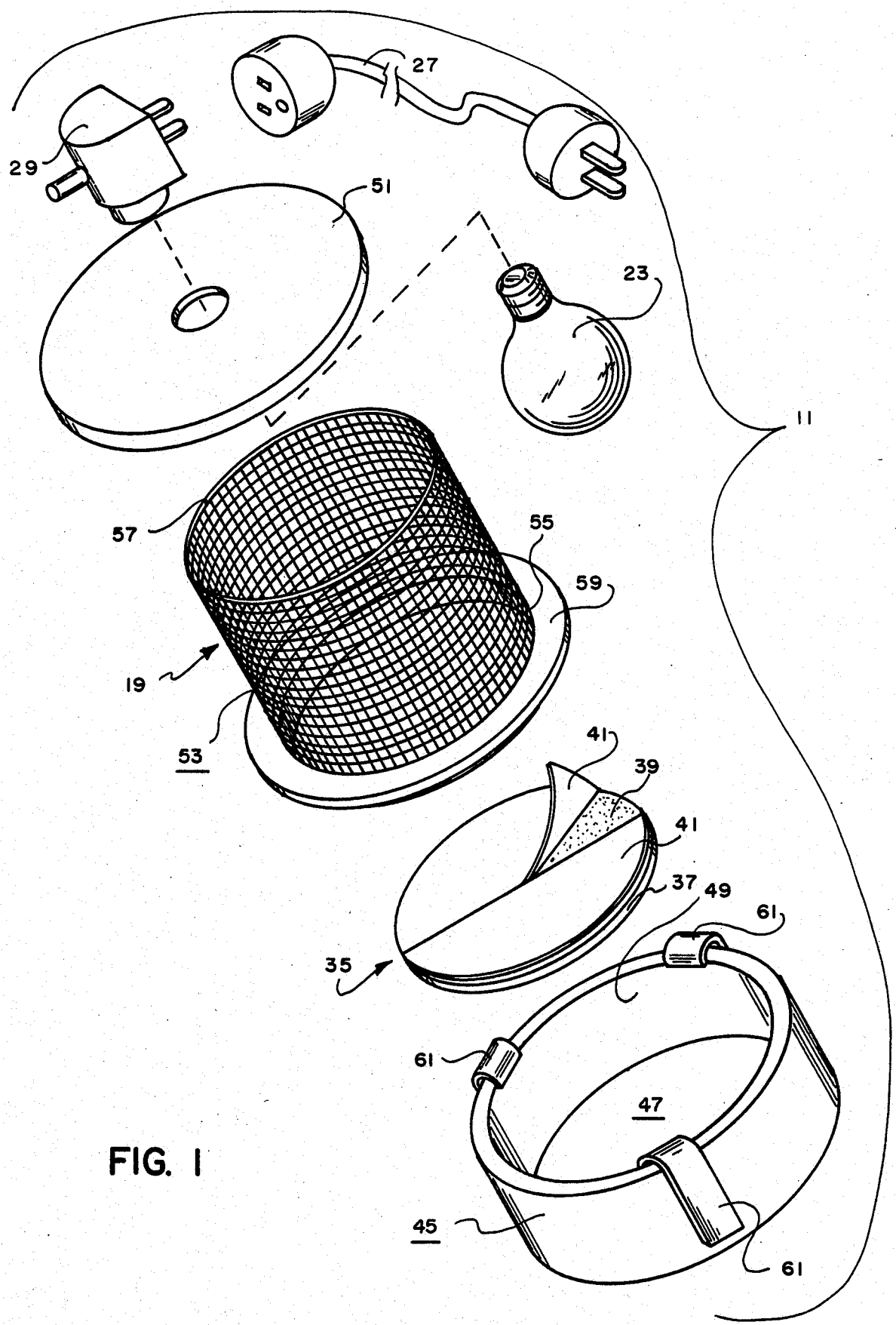
FIG. 1 is an exploded perspective view of the flea attracting and trapping device of the present invention.

The device 11 includes a trapping medium means 35 located within the hollow interior 15 of the housing assembly 13 (see FIGS. 1, 2 and 3) for trapping fleas within the interior 15 of the housing assembly 13. The trapping medium means 35 may be of various types. Thus, as shown in FIGS. 1 and 2, the trapping medium means 35 may include a base member 37 constructed of plastic, cardboard or other like material positioned within the hollow interior 15 of the housing assembly 13 and a sticky substance 39 coating the base member 37 for trapping fleas that come in contact therewith as will be apparent to those skilled in the art. A peel-off disposable cover 41 may be provided over the sticky substance 39 for being easily removed just prior to placing the base member 37 in the hollow interior 15 of the housing assembly 13.

On the other hand, the trapping medium means 35 may consist of a quantity 43 of fluid positioned within the interior 15 of the housing assembly 13 (see FIG. 3) for trapping fleas that come in contact therewith as will be apparent to those skilled in the art. The quantity 43 of fluid may consist of water and a small quantity of detergent or light weight oil to hasten the drowning of the fleas.

Figure 3:
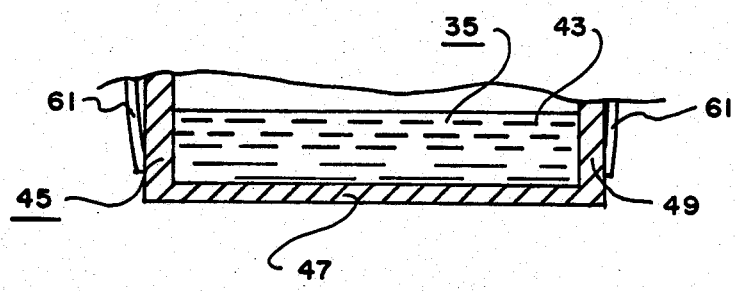
FIG. 3 is a sectional view of a portion thereof showing an alternative trapping medium.

The housing assembly 13 preferably includes a pan member 45 having a substantially flat bottom 47 and an upturned peripheral edge 49 for containing the trapping medium means 35 (see FIGS. 1–3). The pan member 45 is preferably constructed of a durable, noncorrosive material in any manner now apparent to those skilled in the art to provide a water tight pan entirely open at the top and about 1½ inches (38.1 millimeters) deep. The housing assembly 13 preferably includes a top member 51 spaced above the upturned peripheral edge 49 of the pan member 45 with the space between the top member 51 and the upturned peripheral edge 49 of the pan member 45 defining the entrance opening 17 into the hollow interior 15 of the housing assembly 13 (see FIGS. 1 and 2). The top member 51 is preferably constructed of a durable noncorrosive material in any manner now apparent to those skilled in the art. The light means 23 is preferably attached to the top member 51 in any manner now apparent to those skilled in the art to locate the light-producing element of the light means 23 within the hollow interior 15 of the housing assembly 13.

The open mesh screen means 19 of the housing assembly 13 preferably includes an open mesh screen sleeve member 53 having a lower end 55 for being attached to the upturned peripheral edge 49 of the pan member 45 and having an upper end 57 attached to the top member 51 (see FIGS. 1 and 2). The open mesh screen means 19 preferably includes a rim member 59 attached to the lower end 55 of the open mesh screen sleeve member 53 (see FIGS. 1 and 2). The open mesh screen sleeve member 55 may be constructed of typical screen wire or the like having apertures therethrough of a size for allowing fleas to freely pass therethrough while preventing anything substantially larger than a normal flea from passing therethrough. The rim member 59 is preferably constructed of a durable, noncorrosive, stiff material in any manner now apparent to those skilled in the art. The lower and upper ends 55, 57 of the open mesh screen sleeve member 53 may be fixedly attached to the rim member 59 and the top member 51 respectively in any manner now apparent to those skilled in the art, such as by being glued or soldered thereto, etc.

The housing assembly 13 preferably includes a plurality of clasp members 61 attached to the upturned peripheral edge 49 of the pan member 45 for removably attaching the rim member 59 and, therefore, the sleeve member 53 and top member 51 to the upturned peripheral edge 49 of the pan member 45 (see FIGS. 1 and 2). The clasp members 61 are preferably constructed of noncorrosive, durable, spring-type material permanently fixed at the lower end thereof to the exterior side of the upturned peripheral edge 49 of the pan member 45 and extend upward above the top edge of the upturned peripheral edge 49 with a sufficient curvature at the upper end thereof to hook and hold securely above the outer edge of the rim member 59.

A cover member 63 may be positioned over the housing assembly 13 (see FIG. 4) to protect the device 11 from rain and the like when used outside. The cover member 63 is preferably constructed of a durable, noncorrosive material in any manner now apparent to those skilled in the art and is preferably removably attached to either the light means 23 (see FIG. 4) or the top member 51 by way of a screw or the like.

To use the device 11 the trapping medium means 35 is placed in the pan member 45, the rim member 59 is fixed to the pan member 45 by way of the clasp members 61 and the device 11 is placed in any area where fleas are present. The attractant means 21 is then activated.

Although the present invention has been described and illustrated with respect to a preferred embodiment thereof and a preferred use therefore, it is not to be so limited since changes and modifications can be made therein which are within the full intended scope of the invention.

I claim:

1. A device for attracting and trapping fleas, said device comprising:
   (a) a housing assembly having a hollow interior and having an entrance opening for allowing fleas to enter said hollow interior thereof, said housing assembly including an open mesh screen means covering said entrance opening for allowing fleas to freely pass therethrough while preventing anything substantially larger than a normal flea from passing therethrough;
   (b) attractant means located within said hollow interior of said housing assembly for attracting fleas through said open mesh screen means into said hollow interior of said housing assembly; and
   (c) trapping medium means located within said hollow interior of said housing assembly for trapping fleas within said interior of said housing assembly; said housing assembly including a pan member having a substantially flat bottom and an upturned peripheral edge for containing said trapping medium means and including a top member spaced above said upturned peripheral edge of said pan member with the space between said top member and said upturned peripheral edge of said pan member defining said entrance opening into said hollow interior of said housing assembly; said open mesh screen means including an open mesh screen sleeve member having a lower end and having an upper end; said housing assembly including means for attaching said lower and upper ends of said open mesh screen sleeve member relative to said upturned peripheral edge of said pan member and said top member respectively and for preventing inadvertent access into said hollow interior of said housing assembly except through said open mesh screen means and for allowing easy advertent disassembly of said housing assembly to provide access into said hollow interior of said housing assembly by authorized persons.

2. A device for attracting and trapping fleas, said device comprising:
   (a) a housing assembly having a hollow interior and having an entrance opening for allowing fleas to enter said hollow interior thereof, said housing assembly including an open mesh screen means covering said entrance opening for allowing fleas to freely pass therethrough while preventing anything substantially larger than a normal flea from passing therethrough;
   (b) attractant means located within said hollow interior of said housing assembly for attracting fleas through said open mesh screen means into said hollow interior of said housing assembly; and
   (c) trapping medium means located within said hollow interior of said housing assembly for trapping fleas within said interior of said housing assembly; said housing assembly including a pan member having a substantially flat bottom and an upturned peripheral edge for containing said trapping medium means and including a top member spaced above said upturned peripheral edge of said pan member with the space between said top member and said upturned peripheral edge of said pan member defining said entrance opening into said hollow interior of said housing assembly; said open mesh screen means including an open mesh screen sleeve member having a lower end for being attached to said upturned peripheral edge of said pan member and having an upper end attached to said top member and including a rim member attached to said lower end of said open mesh screen sleeve member; said housing assembly including a plurality of clasp members attached to said upturned peripheral edge of said pan member for removably attached said rim member to said upturned peripheral edge of said pan member.

3. The device of claim 2 in which said attractant means includes a light means for generating light within said hollow interior of said housing assembly to attract fleas into said hollow interior of said housing assembly.

4. The device of claim 3 in which said light means generates heat within said hollow interior of said housing assembly to attract fleas into said hollow interior of said housing assembly.

5. The device of claim 2 in which said attractant means includes a heat means for generating heat within said hollow interior of said housing assembly to attract fleas into said hollow interior of said housing assembly.

6. The device of claim 2 in which said attractant means includes an odor producing substance for attracting fleas into said hollow interior of said housing assembly.

7. The device of claim 3 in which is included connection means attached to said light means for allowing said light means to be electrically coupled to a source of alternating current electrical energy.

8. The device of claim 3 in which is included a direct current electrical energy source electrically coupled to said light means.

9. The device of claim 8 in which is included a cover member positioned above said housing assembly.

10. The device of claim 3 in which said trapping medium means includes a base member positioned within said pan member of said housing assembly, and a sticky substance coating said base member for trapping fleas that come in contact therewith.

11. The device of claim 3 in which said trapping medium means includes a quantity of fluid positioned within said pan member of said housing member for trapping fleas that come in contact therewith.

12. The device of claim 11 in which said fluid includes water and a small quantity of detergent.

13. The device of claim 11 in which said fluid includes water and a small quantity of light-weight oil.

* * * * *